United States Patent
Hug et al.

(10) Patent No.: US 8,157,494 B2
(45) Date of Patent: Apr. 17, 2012

(54) PRE-ROUNDING ELEMENT ON A ROUNDING APPARATUS

(75) Inventors: Peter Hug, Fischbach-Goeslikon (CH); Guy Boissin, Fahrweid (CH); Oliver Schulthess, Uster (CH)

(73) Assignee: Soudronic AG, Bergdietikon (CH)

( * ) Notice: Subject to any disclaimer, the term of this patent is extended or adjusted under 35 U.S.C. 154(b) by 0 days.

(21) Appl. No.: 12/630,962

(22) Filed: Dec. 4, 2009

(65) Prior Publication Data
US 2010/0140322 A1    Jun. 10, 2010

(30) Foreign Application Priority Data

Dec. 9, 2008  (CH) ........................... 1929/08

(51) Int. Cl.
*B21D 51/28*    (2006.01)
*B23K 37/00*    (2006.01)
(52) U.S. Cl. ............... 413/69; 413/70; 413/71; 413/72; 228/15.1
(58) Field of Classification Search ............... 228/15.1; 413/69, 70, 71, 72
See application file for complete search history.

(56) References Cited

U.S. PATENT DOCUMENTS

| | | | | |
|---|---|---|---|---|
| 5,155,968 A | * | 10/1992 | Mosse et al. | 53/64 |
| 5,209,625 A | * | 5/1993 | Stieger | 413/72 |
| 6,519,996 B1 | * | 2/2003 | Gasparini | 72/389.5 |
| 2010/0154499 A1 | * | 6/2010 | Hug et al. | 72/31.01 |

FOREIGN PATENT DOCUMENTS

| | | |
|---|---|---|
| DE | 33 30 171 A1 | 2/1984 |
| GB | 2 126 132 A | 3/1984 |

* cited by examiner

*Primary Examiner* — Jessica L Ward
*Assistant Examiner* — Devang R Patel
(74) *Attorney, Agent, or Firm* — McCormick, Paulding & Huber LLP

(57) ABSTRACT

When rounding metal sheet sections for forming can bodies by means of a rounding machine, a pre-rounding element is used, whose lower part is deflectable with respect to the upper part by means of an actuating element. Thereby, the joint between the upper and the lower part is executed as a solid body joint whose section modulus in bending during the deflection is different along the joint. Thereby, a uniform impact on the metal sheet may be reached. Furthermore, the separating gap between the upper and the lower part is arranged obliquely, thus reducing the bending of the lower part.

10 Claims, 5 Drawing Sheets

PRE-ROUNDING ELEMENT ON A ROUNDING APPARATUS

CROSS REFERENCE TO RELATED APPLICATIONS

This application claims the priority of Swiss patent application 1929/08, filed Dec. 9, 2008, the disclosure of which is incorporated herein by reference in its entirety.

BACKGROUND

The invention is related to a pre-rounding element or a rounding element in a rounding apparatus, a rounding apparatus with such a pre-rounding element or a rounding element, as well as a welding device for can bodies with such a rounding apparatus.

PRIOR ART

Rounding apparatuses are used in the manufacturing of container bodies, particularly can bodies, made of metal sheet. For this, after the rounding, the container body blanks are transported directly into a welding machine for the welding of the longitudinal seam of the body. Thereby, the destacking of the metal sheets, the rounding apparatus and the welding machine normally form an entity. Corresponding systems for the production of cans are for example known from DE-A-33 30 171 or from U.S. Pat. No. 5,209,625. Thereby, the rounding takes place in such a way, that the formed can body can be guided directly into the Z-rail used for the seam overlapping. For the rounding, the metal sheet sections which are cut rectangularly, with defined dimensions and material characteristics recorded in standards, are pushed by a dispatch system into a first actuated transport roller pair, transported further by multiple actuated transport rollers with a speed of 100-450 m/min. and bent to a round body in a rounding apparatus with a rounding system, by means of wedges and rollers or by means of roller systems. Particularly, a pre-rounding wedge located ahead of the rounding rollers is used, influencing the rounding result. Optionally, a preliminary plastic deformation serving for stress relief in the metal sheet before the rounding additionally takes place in advance, by means of a wedge system of an optional flexer station. Such rounding apparatuses or installations respectively are known to the skilled person. Depending on the quality of the metal sheet, the metal sheets produced in series have different sheet thicknesses and material characteristics, like yield point, elongation and strength characteristics, which lead to different body diameters after the rounding process and therefore to different openings at the free ends. Because thereby not all of the frames rounded in series are located at the same position within the rounding station and they have different rounding diameters, this may result in variations of the degree of overlapping in the welding station, which is problematic for the welding of the body, or it may lead to problems during the lateral pushing of the bodies out of the rounding machine and into the welding installation and therefore to a machine stop with long downtimes. The efficiency of the machine is thereby reduced and shortfall costs arise for the machine operator.

According to the prior art, the adjustment of the pre-rounding wedge is done manually and it depends on the mentioned metal sheet characteristics, like yield point, metal sheet thickness and also on the format dimensions of the metal sheets. If different metal sheet qualities have to be handled, the pre-rounding wedge has to be adjusted every time again during the idle time of the rounding apparatus. In order to avoid said problems when rounding and welding can bodies, metal sheets with low variations in material characteristics and from one manufacturing series of the metal sheet producer are used. A mixing of different metal sheets is avoided as much as possible. The rounding has to be often checked and the rounding system, particularly the pre-rounding wedge, has to be readjusted if necessary, wherein this has to be done during the idle time, thus resulting in a lower efficiency of the rounding apparatus and of subsequent steps and in shortfall costs for the machine operator. During operation, the adjusted pre-rounding or rounding by means of the pre-rounding element and/or of the rounding element may vary depending on the different force which the metal sheets exercise on the element. A pre-rounding element with an actuating member, apt for avoiding these disadvantages, is proposed in the Swiss patent application No 0608/08.

SUMMARY OF THE INVENTION

It is the task of the invention to improve such a pre-rounding element or rounding element.

This is achieved by a pre-rounding element or a rounding element in a rounding apparatus, comprising a substantially rigid upper element part which is formed to be attached at the rounding apparatus by means of attachment members, or which is formed by an apparatus-fixed part of the rounding apparatus, a lower element part designed for acting upon the metal sheets to be rounded, which are located in the rounding apparatus, a joint arrangement by means of which the lower element part is connected to the upper element part in an articulated way, as well as at least an actuating element by means of which the lower element part is deflectable in such a way, that metal sheets to be rounded can be actuated differently by the lower element part, wherein the joint arrangement has a solid body joint which connects the upper element part and the lower element part in a substantially continuous way and which has areas, along its longitudinal elongation, with different section modulus's in bending for the deflection movement particularly areas of different material thickness, wherein the section modulus in bending or the material thickness respectively has its highest value in the area where the actuating element introduces a force which acts on the lower element part. The task is further achieved by a pre-rounding element or a rounding element in a rounding apparatus, comprising a substantially rigid upper element part which is formed to be attached at the rounding apparatus by means of attachment members, or which is formed by an apparatus-fixed part of the rounding apparatus, a lower element part designed for acting upon the metal sheets to be rounded, which are located in the rounding apparatus, a joint arrangement by means of which the lower element part is connected to the upper element part in an articulated way, as well as at least an actuating element by means of which the lower element part is deflectable in such a way, that metal sheets to be rounded can be actuated differently by the lower element part, wherein the separating gap between the upper element part and the lower element part, which follows the joint of the joint arrangement, runs with a deviation from the horizontal direction and the end of separating gap, located opposite of the joint, is located above the joint with respect to the horizontal direction.

This permits a change of the impact of the metal sheet to be rounded during operation and at the same time keeps the adjusted influence on the metal sheet constant.

The pre-rounding element or rounding element has a solid body joint, thus resulting in a simple construction. The solid body joint works in a play-free and wear-free way. Thereby, the solid body joint is formed in such a way, that a mostly uniform deflection by the actuating member results. This results in a uniform influence of the element on the metal sheet and therefore in a good and uniform rounding result.

According to a further aspect of the invention, the pre-rounding element or the rounding element is constructed by means of the claimed features in such a way, that its lower part is deformed as little as possible during its influence on the metal sheet. This results in a more uniform influence of the element on the metal sheet and therefore in a good and uniform rounding result.

Such a pre-rounding element and/or rounding element are used in a rounding apparatus and in a welding device according to the invention.

BRIEF DESCRIPTION OF THE DRAWINGS

Further embodiments, advantages and applications of the invention result from the dependent claims and from the now following description by means of the figures.

DESCRIPTION OF THE PREFERRED EMBODIMENTS

Figure 1:
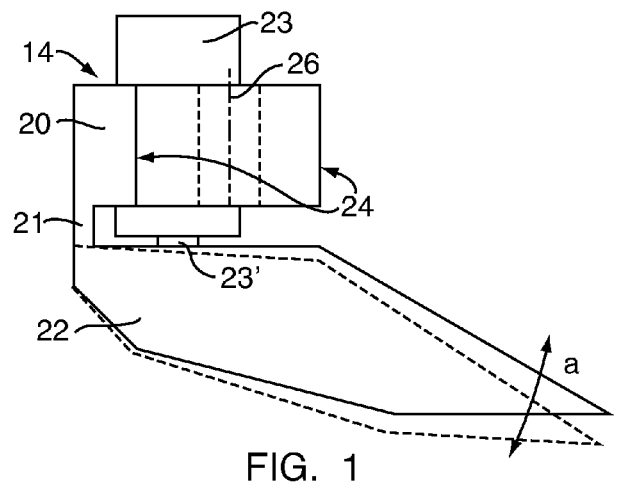
FIG. 1 is a side view of a pre-rounding element for a general explanation of its construction.

FIG. 1 shows in a side view a pre-rounding element 14. Its operation within a rounding apparatus 4 is shown schematically in FIG. 2. The rounding element 13 of the rounding apparatus 4 may be executed according to the aspects of the invention as well. In the following examples they will be explained by means of a pre-rounding element, however the corresponding execution and use as rounding element is included therein as well.

The pre-rounding element 14, which is a pre-rounding wedge in the shown embodiment, because its lower part 22 which acts upon the respective metal sheet is wedge-shaped in its front section, has a rigid or, during operation, fixed upper element part 20 respectively. In this embodiment, it is a part 20 which is executed to be fixed at a machine part of the rounding apparatus, in the shown example having attachment means on both sides, for example bores 26 and guides 24, which allow an attachment to the rounding apparatus and a vertical base setting to it. The upper part 20 which is apparatus-fixed at the rounding apparatus may also directly be a fix part of the rounding apparatus. An alternative attachment may be carried out by means of vertical threaded rods for the adjustment of the height and at least a vertical guide and a final fixing by means of at least a horizontal screw which pulls the part 20 against the vertical guide.

The deflectable lower element part 22 or the lower wedge part 22 respectively is arranged at the part 20 or at the upper element part respectively, by means of a joint arrangement 21.

The deflection is shown by means of an arrow a. The deflection is made possible by an actuating element 23 which will be called actuator in the following. The actuator is firmly arranged with its stationary part in the upper part 20 and the movable, actionable part 23' of the actuator acts upon the lower part of the wedge 22; alternatively, the movable part is fixed in of the upper part and the other part of the actuator acts upon the lower part of the wedge. If the part 23' presses downwards in the figure, the lower wedge part 22 is deflected in such a way, that it can take on the position which is drawn punctuated position in case of a maximum deflection. If the actionable part 23' of the actuator 23 is in a stationary position, the position of the wedge 22 shown with a solid line is reached. Depending on the force or on the deflection being exerted by the actuator on the wedge 22, a preliminary position between the shown positions results. The actuator may pull the part 22 upwards as well. Then, a middle position between both of the shown positions may for example be the non-deflected position.

The joint arrangement connecting the upper part 20 and the wedge 22 is a solid body arrangement in this example, consisting of a suitably dimensioned solid body joint which is elastically deformed by the force of the actuator 23. Accordingly, a retraction is the result when the force of the actuator or its deflection is reduced. The restoring force may also be generated by the actuator. Preferably, the joint arrangement 21 is executed as a solid body joint in one piece with the upper part 20 and the lower part 22, as shown in FIG. 1. The actuator 23 may be an arbitrary controllable drive. A piezo-electrical actuator is preferred because small deflections only are necessary and a fast reaction time is advantageous. Other controllable drives may also be used as an actuating element 23, like electromotive drives, magnetic drives, a pneumatic drive or a hydraulic drive.

Figure 2:
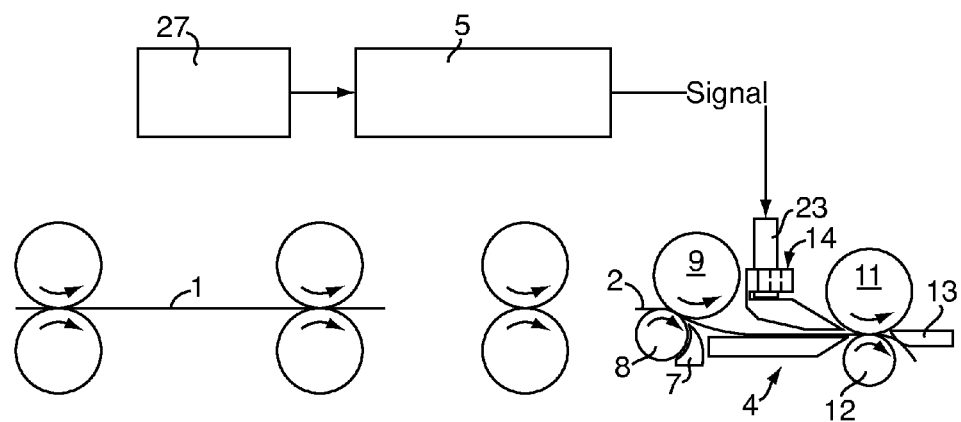
FIG. 2 schematically shows the arrangement of a pre-rounding element according to the invention in a rounding apparatus.

FIG. 2 shows schematically the feeding of a metal sheet 1 into a rounding apparatus 4, inside of which a further metal sheet 2 is already in the rounding process. The metal sheets have been destacked from a stack not shown here and are continuously rounded by the rounding apparatus. The feeding into the rounding apparatus is done my means of a transport, for example by means of the shown rollers. A flexer station with flexer rollers 8 and 9 and a flexer wedge 7 may be provided within the rounding apparatus. Such flexer stations are known; on one side they remove tensions from the metal sheet and on the other side they cause a rounding of the front edge area of the respective metal sheet. Particularly, a measurement installation used for example for measuring the rounding characteristics of the respective metal sheet, which will be explained in the following, may be connected to the flexer station or may be a part of the latter respectively. Following the flexer station, the actual rounding station of the rounding apparatus 4 is shown schematically. It has the rounding rollers 11 and 12 and a rounding wedge 13 following it in transport direction. These elements are basically known and will not be explained here in more detail. A different type of rounding station may be used instead of such a rounding station, for example a rounding station without a wedge and with shifted rollers. This type is known to the skilled person and will not be explained here.

The pre-rounding element 14 according to the invention is arranged ahead of the rounding rollers and impacts the metal sheet to be rounded. According to the invention, this is done by means of the lower element part 22, which is deflectable during the rounding operation. Thereby, during the rounding it may be acted individually upon each metal sheet by means of the pre-rounding element 14 and the rounding result may be influenced for each metal sheet. Thereby, the actuator 23 is controlled by a signal coming from a controller 5. This may be the controller of the rounding apparatus or the controller of a welding device for container bodies comprising the rounding apparatus. The controller 5 may also be a separate controller which interacts with said controllers if necessary. Thereby, the controlling of the pre-rounding element 14 for example takes place in the meaning of a pre-setting of the rounding apparatus by an operator, such that the operator prescribes a certain deflection of the lower part 22 by means of the controller 5. Following this, it is stuck to the pre-setting for all metal sheets until the operator sets a new pre-setting. On the other side, the deflection may be chosen from recorded default values by the controller 5. The operator then inputs for example the metal sheet format and/or the metal sheet material and/or the metal sheet thickness and/or a code label and the controller chooses the corresponding deflection of the lower element part 22 from the recorded values. In a preferred embodiment, the measurement of at least a metal sheet characteristic is done by means of at least a measurement installation 27 and the measured value triggers the controller 5 to adjust the actuator 23 or the deflection of the lower element part 22 respectively. The measurement may preferably be done for each metal sheet and thereby the pre-rounding element may be adjusted or controlled respectively for each metal sheet of the sequence of metal sheets to be rounded. However, the measurement may be carried out for individual metal sheets only, for example for each tenth metal sheet or for only one metal sheet of a lot of metal sheets, for example the first metal sheet of a metal sheet stack. The metal sheet thickness may for example be used as measuring value. Such installations are known and will not be explained here in more detail. Preferably, the rounding behaviour of the metal sheet is measured and used for controlling the pre-rounding element 14, this being explained in more detail in the following.

FIGS. 3 to 6 show an embodiment of an element 14, featuring both aspects of the invention. On one side, the joint 21 is executed in such a way, that its section modulus against the deflection is different along its longitudinal elongation. On the other side, the separating gap 21' between the upper part 20 and the lower part 22 is not executed following a horizontal direction (thus not as shown in FIG. 1) and the opening of the separating gap 21' located opposite of the joint lies above the joint 21. These aspects will be explained in more detail in the following.

Figure 3:
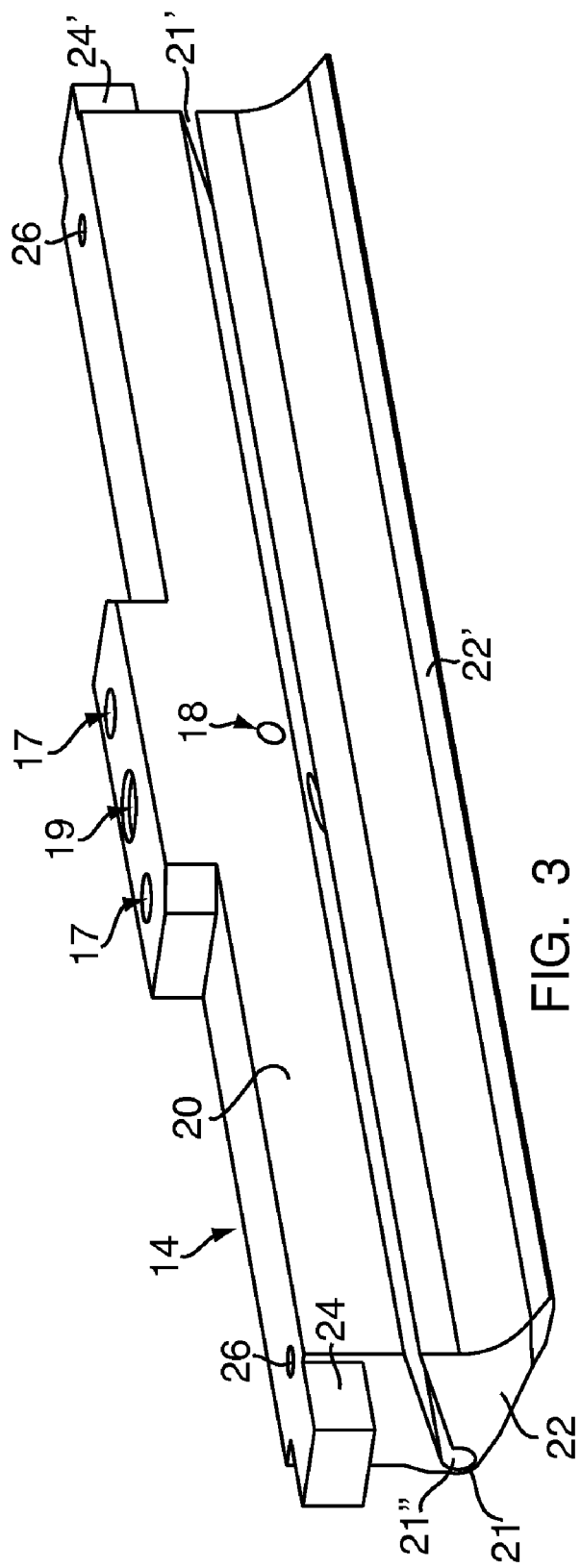
FIG. 3 is a graphical view of an embodiment of a pre-rounding element.
Figure 4:
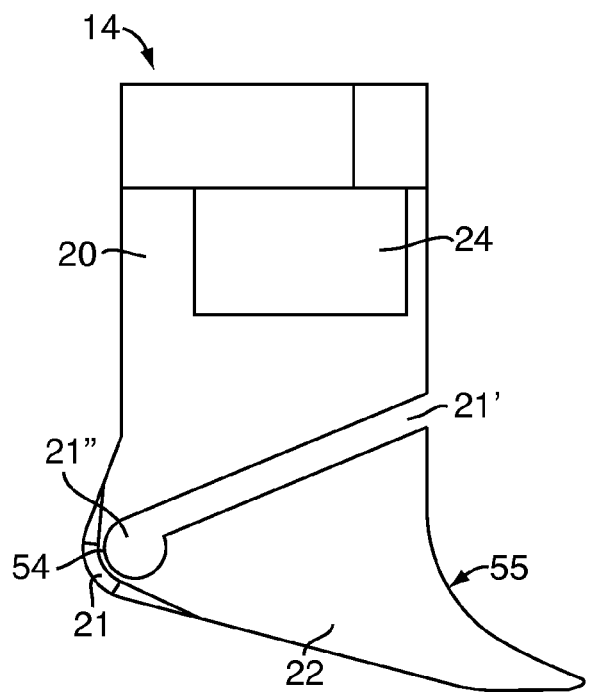
FIG. 4 is a side view of the pre-rounding element of FIG. 3.
Figure 5:
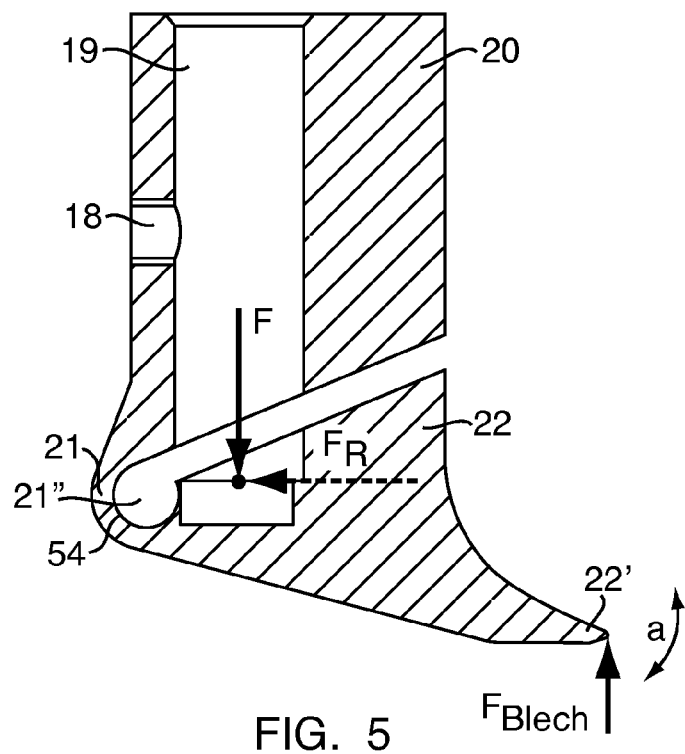
FIG. 5 is a vertical view of the pre-rounding element of FIG. 3 or FIG. 4 respectively.
Figure 6:
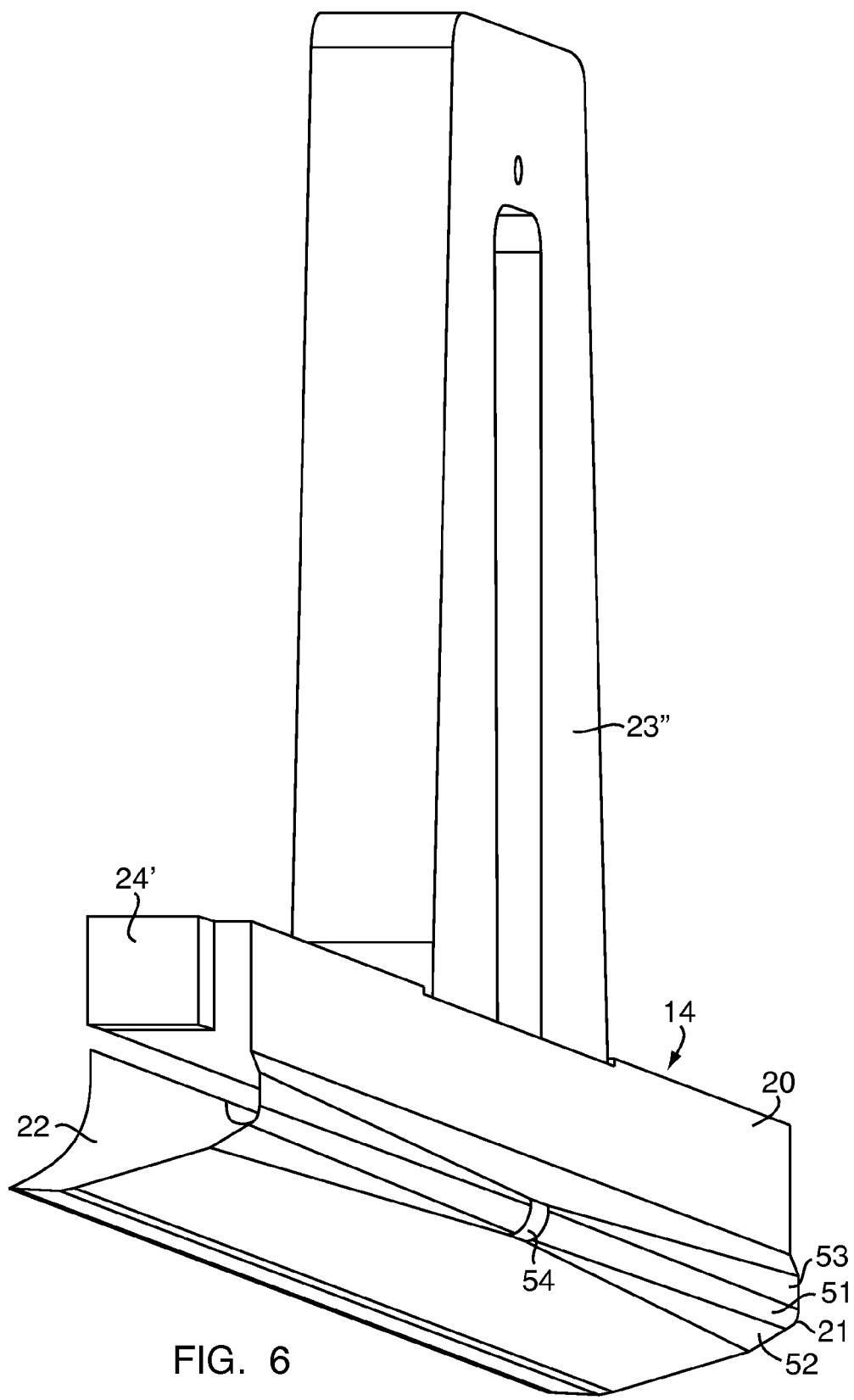
FIG. 6 is a backside view of a pre-rounding element.

The graphical view of the pre-rounding element 14 shows this element with the upper part 20 and the lower part 22, which are connected by means of the joint 21. The latter is a solid body joint which may be executed by a one piece construction of the upper part 20 and the lower part 22 in this example. The solid body joint may also be executed in another way, for example by means of a leaf spring arrangement. The one piece execution is at most related only to the connection between the upper part 20 and the lower part 22. The lower part 22 itself may be executed from multiple parts, particularly the actual wedge tip 22' of the pre-rounding element 14 may consist of a different material that the lower part 22. Thereby, a more wear resistant and stronger material than for the lower part 22 may particularly be chosen for the wedge tip 22'. The connection of the parts 22 and 22' may be carried out by welding, bonding or in another way. Within a preferred embodiment, the back part of the wedge and the front part are screwed together, thus allowing the replacement of the front part, either because of wear or for changing the shape of the wedge. The already mentioned side guides 24 and 24' of the element 4 and the bores 26, particularly threaded bores, for the vertical fixing of the element 14 to the rounding machine are shown in FIG. 3; as explained, another type of connection may be used as well. The actuating element 23 is not shown in FIGS. 3, 4 and 5. In this embodiment, it is designed in such a way, that it is attached to the top of the upper part 20 by means of threaded bores 17, such that the tappet 23', which is indicated in FIG. 1, is guided through the cavity or the guide 19 respectively and downwards towards the lower part 22. A horizontal threaded bore 18, which may be arranged on the front side, as shown in FIG. 3, or on the back side, as shown in FIG. 5, serves for the insertion of a threaded bolt which itself may serve for the alignment of the tappet 23'. The tappet of the actuator may also be guided in another manner. A support 23" for the actuator, itself not depicted in the figure, is shown in FIG. 6 above the upper part 20.

FIG. 3 shows the one end of the solid body joint 21. This joint is preferably arranged without interruption across the entire length of the pre-rounding element 14. If necessary, the joint may also have interruptions. In FIG. 3 and particularly in FIG. 4, the latter showing a top view of the side of the element 14 with the guide 24 seen in FIG. 3, it is shown that the material thickness of the joint 21 is small at its end. This is shown in the side view of FIG. 4 by the small material thickness labelled with the numeral 54. On the contrary, FIG. 5 shows a vertical section through the middle of the element 14 and therefore through the guide 19, wherein it is evident that the material thickness 54 of the joint is higher over there. The material thickness of the joint 21 decreases towards the other lateral end with the guide 24', until it is as low as shown in FIG. 4 also at this lateral end. Within this pre-rounding element 14, for which the introduction of force takes place through the middle by means of the actuating element, this being a preferred embodiment, a more uniform deflection of the lower part 22 across the entire length of the pre-rounding element is reached by means of the material thickness of the joint when bent by the actuator, which decreases starting from the middle in a lateral direction to the outside, as this would be the case without this measure. This results in a more uniform impact of the lower part 22 on the metal sheet to be rounded and thereby in an improved rounding result. FIG. 5 shows the introduction of force, wherein the force F which is initiated by the actuating element causes the deflection a of the lower part 22. Regarding the choice of the material thickness, the joint 21 is executed at the position of the pre-rounding element 14, whereat the introduction of force occurs by means of the actuating element, in such a way that at that position the bending resistance element is the highest and it is reduced with an increasing distance from the position of introduction of force. This may be done in the shown way by reducing the material thickness or the cross section of the joint respectively with increasing distance from the position of introduction of force. This may also be done by means of a change of another material parameter of the solid body joint, for example by means of an execution of the solid body joint in sections of different materials which have a different section modulus in bending.

Figure 7:
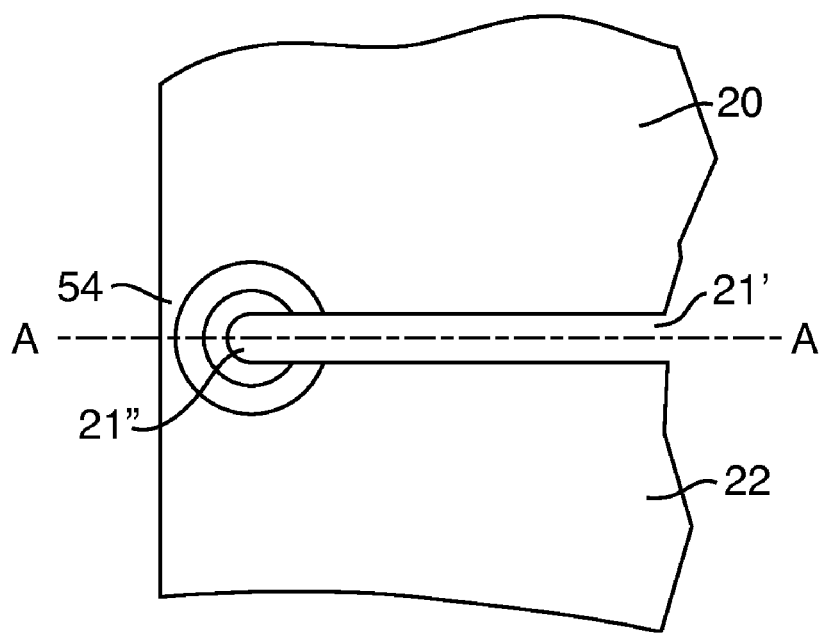
FIG. 7 is a side view of part of a further embodiment of a pre-rounding element.
Figure 8:
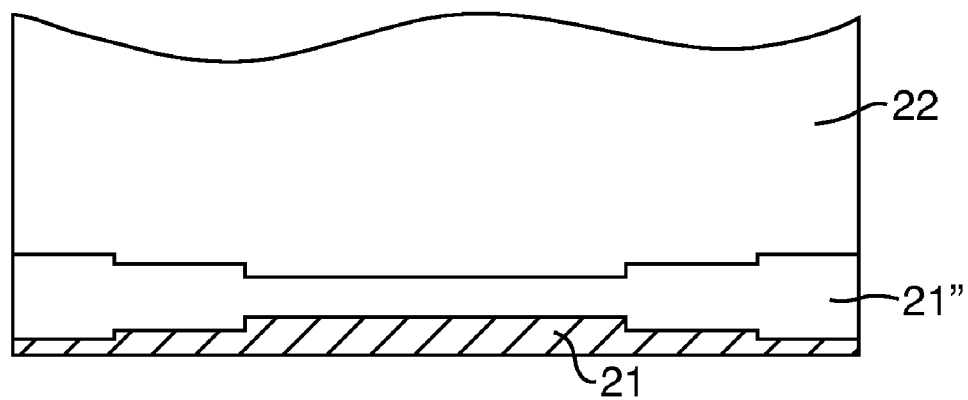
FIG. 8 is a horizontal section view through the embodiment according to FIG. 7.

The execution of the change of the material thickness may for example be done starting from the outside of the element 14, as shown in the embodiments of FIGS. 3 to 6. There it is seen that the material thickness of the solid body joint decreases starting from the middle position of introduction of force of this embodiment in such a way, that at least a material removal 51 reducing the material thickness of the solid body joint towards both sides takes place on the rear of the outer side. Preferably, further removals 52 and 53 are carried out such that a faceted removal of material on the rear side results. A change of material thickness on the outer sides results as well if the solid body joint is formed by a leaf spring package which has more leaf springs at the position of introduction of force than towards the sides of the element 14. The different material thickness 54 may also be executed by means of different diameters of a cavity 21'', particularly a bore, defining the solid body joint; another type of processing like for example milling may be used instead of a bore process. The provision of such a cavity is shown in FIGS. 7 and 8, wherein only the joint part of the pre-rounding element 14 is shown. Thereby, a section of the upper part 20 and a section of the lower part 22 are shown in side view in FIG. 7 and it is evident that the cavity 21'', particularly the bore, defining the joint 21, is a stepwise cavity or stepwise bore respectively. This is shown in FIG. 8 in the horizontal section view at the cutting line A-A of FIG. 7. It shows a section of the lower part 22 and the bore 21'' of the joint, which has a smaller diameter in sections towards the middle of the joint. Thereby, the material thickness of the solid body joint increases towards the middle or decreases towards the outer sides respectively. Instead of a stepped bore a tapered shape of the bore may be provided as well. The cavity may also be executed in another manner, for example by means of a slit with a radius at one side.

The shown examples assume a centred introduction of force and hence a reduced section modulus in bending towards the outer sides of the element 14. This may be executed in a different way as well, by introducing the force on both outer sides and thereby providing the section modulus in bending or the higher material thickness respectively at the outer parts. The material thickness would then decrease towards the middle. In the examples, the joint is also placed at the rear side of the element 14; this is however not mandatory, the joint may be arranged at the front side of the element 14 or in its middle or in other intermediate positions between the rear side and the front side as well.

FIGS. 3 to 6 show the second aspect of the invention, according to which the separating gap 21' between the upper part 20 and the lower part 22 runs differently than in the horizontal direction. As already mentioned, the force F of the actuating element acts upon the lower part 22. Furthermore, during the rounding process, the resisting force $F_{Blech}$ acts upon the lower part 22. These two forces cause a deformation of the lower part, particularly of the edge of the wedge tip 22'. The lower part 22 of the element 14 has a higher volume and thereby a higher section modulus in bending against the bending of the edge 22' because of the course of the separating gap 21' which deviates from the horizontal direction. A better rounding result is reached because of a reduction of this bending. The separating gap 21' preferably runs oblique to the horizontal direction and particularly straight, thus resulting in an easy manufacturing. Thereby, the deviation from the horizontal position can be seen in case that the element 14 is built-in as required or in case of the element which is held in its mounting position by means of attachment members respectively. It is further preferred that the surface 55 of the element 22 facing the rounding roller 11 of the rounding apparatus 4 has a concave rounded and particularly substantially cylinder-envelope-shaped section. This shape also has an influence of reducing the bending. Instead of a rounding, multiple oblique and uniform surfaces, which substantially equal a rounding, may be provided.

The invention claimed is:

1. A pre-rounding element or a rounding element in a rounding apparatus, comprising:
    a substantially rigid upper element part which is formed to be attached at the rounding apparatus by means of attachment members, or which is formed by an apparatus-fixed part of the rounding apparatus,
    a lower element part designed for acting upon the metal sheets to be rounded, which are located in the rounding apparatus,
    a joint arrangement by means of which the lower element part is connected to the upper element part in an articulated way, and
    an actuating element by means of which the lower element part is deflectable in such a way that metal sheets to be rounded can be actuated differently by the lower element part,
    wherein the joint arrangement has a solid body joint which connects the upper element part and the lower element part in a substantially continuous way and which has areas along a longitudinal elongation of the solid body joint with different section moduli in bending for the deflection movement,
    wherein at least one of the section modulus in bending of the solid body joint or a material thickness of the solid body joint has its highest value in the area where the actuating element introduces a force which acts on the lower element part, and
    wherein the longitudinal elongation of the solid body joint is substantially transverse to the direction of the deflection movement.

2. The pre-rounding element or the rounding element of claim 1, wherein the section modulus in bending or the material thickness changes continually.

3. The pre-rounding element or the rounding element of claim 1, wherein the section modulus in bending or the material thickness respectively changes stepwise.

4. The pre-rounding element or the rounding element of claim 1, wherein the section modulus in bending or the material thickness has its highest value in the middle of the longitudinal elongation of the joint.

5. The pre-rounding element or the rounding element of claim 1, wherein the material thickness is reduced by an external removal of material at the element.

6. The pre-rounding element or the rounding element of claim 1, wherein the material thickness is reduced by an internal removal of material in the element, particularly by means of a stepwise cavity or a tapered cavity.

7. The pre-rounding element or the rounding element of claim 1, wherein the upper element part and the lower element part are interconnected in one piece.

8. The pre-rounding element or the rounding element of claim 3, wherein the upper element part and the lower element part are interconnected by means of a leaf spring arrangement.

9. The pre-rounding element or the rounding element of claim 1, wherein the surface of the element facing the rounding roller of the rounding apparatus has a section with a concave shape.

10. A rounding apparatus for rounding individual metal sheets comprising the pre-rounding element or the rounding element of claim 1 and a controller for the actuation of the pre-rounding element depending on at least one of an input value, a default value and a measured value of the metal sheet characteristic of individual metal sheets to be rounded.

* * * * *